(12) United States Patent
Bookman et al.

(10) Patent No.: US 9,977,698 B2
(45) Date of Patent: May 22, 2018

(54) VIRTUAL MACHINE MIGRATION INTO THE CLOUD

(75) Inventors: Peter Bookman, Sandy, UT (US);
Chris R. Featherstone, South Jordan, UT (US)

(73) Assignee: V3 SYSTEMS HOLDINGS, INC., Draper, UT (US)

( * ) Notice: Subject to any disclaimer, the term of this patent is extended or adjusted under 35 U.S.C. 154(b) by 136 days.

(21) Appl. No.: 13/563,603

(22) Filed: Jul. 31, 2012

(65) Prior Publication Data

US 2014/0040888 A1 Feb. 6, 2014

(51) Int. Cl.

| G06F 9/455 | (2018.01) |
|---|---|
| G06F 9/46 | (2006.01) |
| G06F 15/173 | (2006.01) |
| G06F 9/50 | (2006.01) |
| G06F 9/48 | (2006.01) |
| G06F 9/44 | (2018.01) |

(52) U.S. Cl.
CPC ............ *G06F 9/5088* (2013.01); *G06F 9/455* (2013.01); *G06F 9/45533* (2013.01); *G06F 9/45558* (2013.01); *G06F 9/46* (2013.01); *G06F 9/461* (2013.01); *G06F 9/48* (2013.01); *G06F 9/485* (2013.01); *G06F 9/4843* (2013.01); *G06F 9/4856* (2013.01); *G06F 9/4862* (2013.01); *G06F 9/4868* (2013.01); *G06F 9/4875* (2013.01); *G06F 9/50* (2013.01); *G06F 9/4443* (2013.01); *G06F 9/4445* (2013.01); *G06F 2009/4557* (2013.01); *G06F 2009/45575* (2013.01)

(58) Field of Classification Search
None
See application file for complete search history.

(56) References Cited

U.S. PATENT DOCUMENTS

| 2005/0198303 A1* | 9/2005 | Knauerhase et al. ......... 709/227 |
|---|---|---|
| 2008/0244028 A1* | 10/2008 | Le ......................... G06F 3/0607 709/208 |
| 2009/0007105 A1* | 1/2009 | Fries et al. ....................... 718/1 |
| 2009/0198805 A1* | 8/2009 | Ben-Shaul et al. ........... 709/222 |
| 2009/0216975 A1* | 8/2009 | Halperin et al. .............. 711/162 |
| 2010/0070870 A1* | 3/2010 | Halperin et al. .............. 715/742 |
| 2010/0107163 A1* | 4/2010 | Lee .................................. 718/1 |
| 2010/0306354 A1* | 12/2010 | DeHaan et al. .............. 709/222 |
| 2011/0055377 A1* | 3/2011 | DeHaan ................ G06F 9/4856 709/224 |
| 2011/0185292 A1* | 7/2011 | Chawla ................. G06F 9/4445 715/760 |
| 2011/0185355 A1* | 7/2011 | Chawla ................. G06F 9/5077 718/1 |

(Continued)

*Primary Examiner* — Charles M Swift

(74) *Attorney, Agent, or Firm* — Miller, Matthias & Hull LLP

(57) ABSTRACT

The migration of virtual machines internal to a cloud computing environment. The cloud maintains the replicas for virtual machines that could be migrated. The cloud also is aware of location of user data for each of the virtual machines. The replica together with the user data, represents the virtual machine state. If migration to the cloud computing environment is to occur for any given virtual machine, the cloud computing environment correlates the replica with the user data for that virtual machine, and then uses the correlation to instantiate the virtual machine in the cloud.

20 Claims, 4 Drawing Sheets

(56) References Cited

U.S. PATENT DOCUMENTS

| | | | |
|---|---|---|---|
| 2012/0011509 A1* | 1/2012 | Husain | 718/1 |
| 2012/0089666 A1* | 4/2012 | Goswami et al. | 709/203 |
| 2012/0151477 A1* | 6/2012 | Sinha et al. | 718/1 |
| 2012/0240181 A1* | 9/2012 | McCorkendale | G06F 21/57 726/1 |
| 2012/0278726 A1* | 11/2012 | Halperin et al. | 715/742 |
| 2013/0007741 A1* | 1/2013 | Britsch | G06F 9/4401 718/1 |
| 2013/0185715 A1* | 7/2013 | Dunning | G06F 9/45558 718/1 |
| 2013/0212579 A1* | 8/2013 | Ben-Shaul et al. | 718/1 |
| 2013/0235874 A1* | 9/2013 | Ringdahl et al. | 370/395.53 |
| 2013/0326503 A1* | 12/2013 | De et al. | 718/1 |

\* cited by examiner

VIRTUAL MACHINE MIGRATION INTO THE CLOUD

BACKGROUND

For more than 40 years, technologists have known that one way to lower computing costs is to simultaneously share resources across multiple components and/or machines. This concept eventually led to the so-called client/server networking model where multiple desktop computers were linked together to a server where files and printer resources could be shared. Given the success achieved in improved performance and lowered costs through virtual servers, companies have been diligently attempting to replicate their efforts with "virtual desktops", which will now be explained.

As a user interfaces with a client computing system (hereinafter referred to as a "client"), the user is presented with a desktop environment. The desktop environment may include an intuitive visualization of various icons, windows, and other tools that that user may interact with to manipulate the various applications and environments offered by the desktop environment.

As events occur (such as user input), the desktop environment is processed in a manner that is appropriate given the event, resulting in perhaps some change to the state of the desktop environment. Conventionally, such desktop processing occurs on the client. However, desktop virtualization involves the offloading of the desktop processing to a location other the client (hereinafter referred to as a "virtual machine host", "host computing system" or simply "host"), which location is perhaps even remote from the client. That offloaded location may be a server, a server cluster, or a server cloud.

The host maintains a virtual machine for each supported desktop environment. The virtual machine has access to all of the desktop state necessary to construct an image for how the desktop environment should appear. The virtual machine also manages the processing that serves up desktop images to the corresponding client, which are rendered by the client as they are received.

As the client interacts with the displayed desktop image, that client input is transmitted to the host. The corresponding virtual machine at the centralized desktop location interprets the client input, and processes the desktop. In response to this input, or in response to some other detected event, the virtual machine changes the state of the desktop if appropriate. If this changed state results in a change in how the desktop appears, the virtual machine constructs a different desktop image, and causes the host to transmit the altered desktop image to the client. From the user's perspective, this occurs often fast enough that the displayed desktop at the client is substantially immediately responsive to the user input at the client.

A typical host may manage a number of virtual machines for a corresponding number of clients. In some cases, the host may manage hundreds of virtual machines. The host provides software and data support (hereinafter referred to as the "support resources") to the virtual machine(s). For instance, the operating system and certain applications may be provided by the host. Supporting data may also be included within the support resources. For instance, user data (such as persistent preference information) may also be stored by the host.

All of the software and data support resources are conventionally located on the host itself. An alternative conventional solution occurs when an organization has access to multiple hosts. To provide backup, the organization will provide access to a storage area network (SAN) to multiple physical appliances, and store the software and data support resources on the SAN. If a failure were to occur with a host, the support resources are still available on the SAN from the other physical appliance. Thus, an instance of the physical machine may be constructed on the other host, and mapped to the corresponding software and data storage resources on the SAN, thereby effecting recovery.

BRIEF SUMMARY

At least one embodiment described herein relates to the migration of one or more virtual machines from external to a cloud computing environment to internal to a cloud computing environment in a context in which localized virtual machine state portions for virtual machines are maintained in the cloud computing environment. For instance, the cloud computing environment may contain a replica store that contains replicas associated with all of the virtual machines for which such migration is supported (in which case a single replica may support an entire pool of pooled virtual machines). The cloud computing environment also is aware of location of a centralized virtual machine state portion for each of the virtual machines for which such migration is supported. For instance, the centralized virtual machine state might be user data for each virtual machine. The replica together with the user data, represents the virtual machine state.

If migration to the cloud computing environment is to occur for any given virtual machine, the cloud computing environment correlates the centralized virtual machine state portion with the localized virtual machine portion for that virtual machine. The cloud computing environment may then itself host the virtual machine by instantiating the virtual machine in the cloud computing environment using the centralized virtual machine state and the localized virtual machine state. If multiple tenants are supported, the cloud computing environment isolates the virtual machine along tenant boundaries, thereby preventing tenants from accessing virtual machines other than those belonging to the tenant, even if virtual machines from diverse tenants are present on a single host computing system in the cloud computing environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with at least one embodiment described herein, the migration is described of one or more virtual machines from external to cloud computing environment to internal to a cloud computing environment in a context in which localized virtual machine state portions (e.g., a replica) for virtual machines are maintained in the cloud computing environment. The cloud computing environment also is aware of location of a centralized virtual machine state portion (e.g., user data) for each of the virtual machines for which such migration is supported. The replica together with the user data, represents the virtual machine state.

If migration to the cloud computing environment is to occur for any given virtual machine, the cloud computing environment correlates the centralized virtual machine state portion with the localized virtual machine portion for that virtual machine. The cloud computing environment may then itself host the virtual machine by instantiating the virtual machine in the cloud computing environment using the centralized virtual machine state and the localized virtual machine state. If multiple tenants are supported, the cloud computing environment isolates the virtual machine along tenant boundaries. First, some introductory discussion regarding computing systems will be described with respect to FIG. 1. Then, embodiments of the migration will be described with respect to FIGS. 2 through 5.

Figure 1:
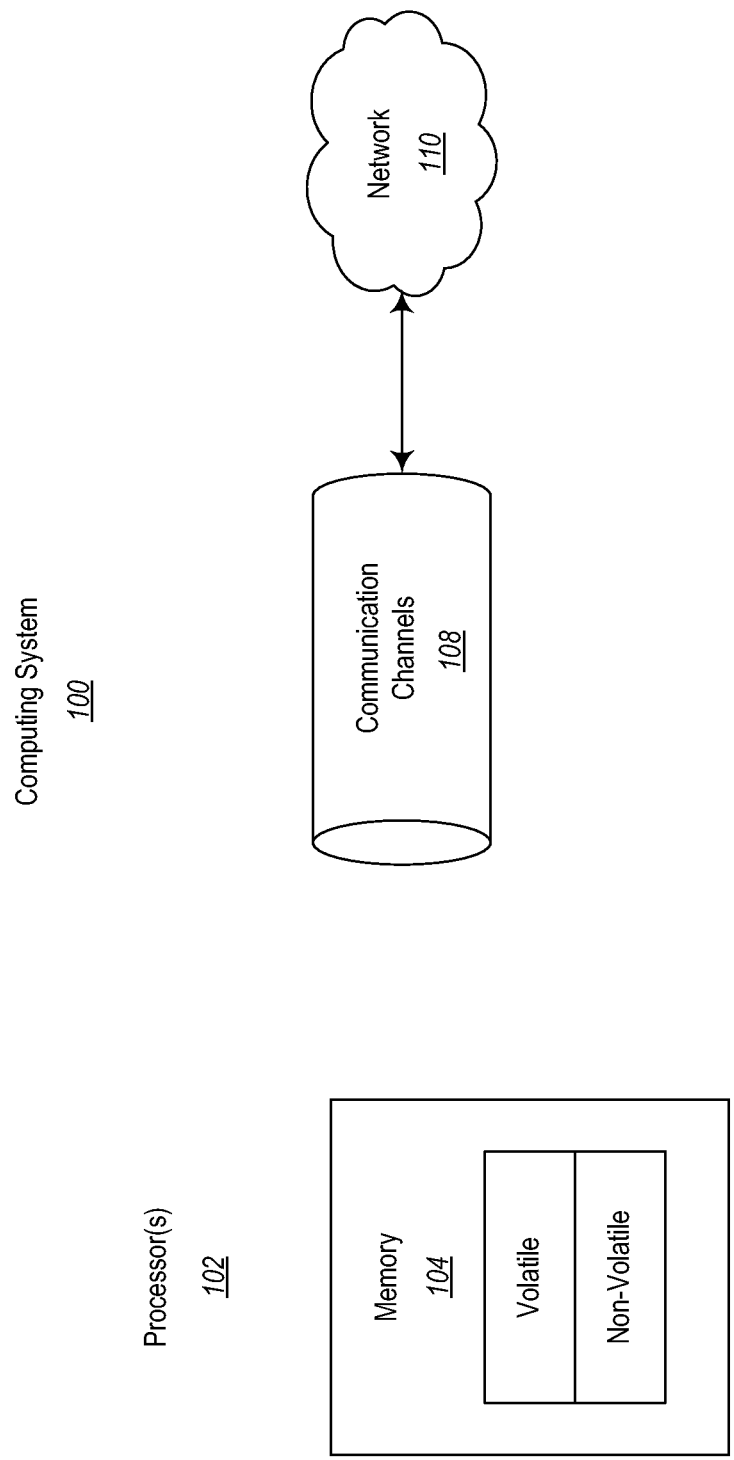
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
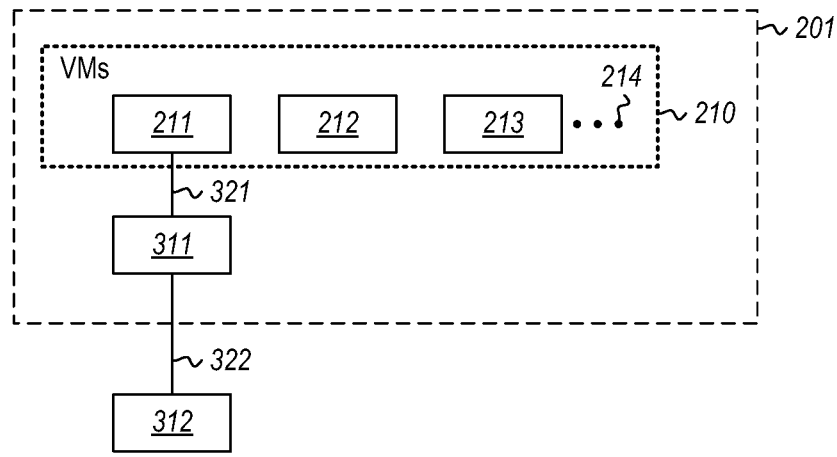
FIG. 2 illustrates a virtual machine environment that includes a single physical support environment supporting multiple virtual machines.

FIG. 2 illustrates a virtual machine operation environment 200. The operation environment includes a host computing system 201 in which a set of virtual machines 210 operate. The host computing system 201 may be, for example, the computing system 100 of FIG. 1, or any other device, system, or combination thereof that is capable of providing physical resources to assist in the operation of virtual machines.

There may be any number of virtual machines 210 operating in the host computing system 201. In FIG. 2, there are three virtual machines 211, 212 and 213 shown, with ellipses 214 representing that the number of virtual machines 210 may be as few as one, but potentially as many thousands, or even more. Each virtual machine manages state (e.g., a desktop state) for a corresponding client that may perhaps be remotely located. The virtual machine provides an image representing a desktop image to the corresponding client, and alters the image or other desktop state in response to detected events, such as, for example, a user interfacing with the current desktop image.

As the client interacts with the displayed desktop image corresponding to a virtual machine, that client input is transmitted to the host computing system 201. The corresponding virtual machine interprets the client input, and processes the client input. In response to this input, or in response to some other detected event, the virtual machine changes the state of the virtual desktop if appropriate. If this changed state results in a change in how the desktop appears, the virtual machine constructs and transmits another desktop image to the client. From the user's perspective, this occurs often fast enough that the displayed desktop is substantially immediately responsive to the user input.

Each virtual machine needs resources in order to operate properly. The host computing system 201 provides a variety of support resources for each of the virtual machines 210. For instance, some of that support includes hard (physical) support resources such as processing resources, memory resources, storage resources, network access resources, and the like. However, each virtual machine also uses soft support resources, such as software and data, referred to collectively as "virtual machine state". As far as software virtual machine state, the virtual machine may use an operating system, one or more applications, and/or one or more other software modules. As far as data virtual machine state, the host computing system 201 may host some or all of data that is used by the virtual machine in order to operate, such as user preference data, and other application state.

Figure 3:
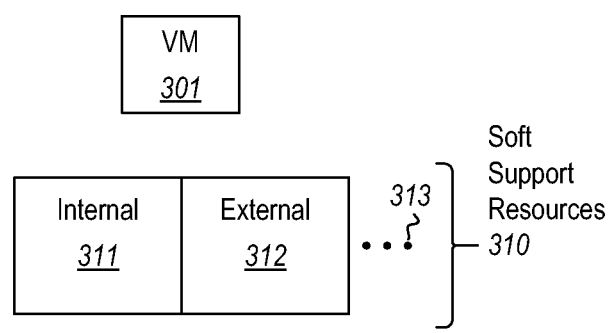
FIG. 3 illustrates a virtual machine in conjunction with internal and external soft support resources that represent localized virtual machine state, and centralized virtual machine state.

Referring to FIG. 3, an environment 300 is shown in which a virtual machine 301 is shown in conjunction with its virtual machine state 310. The virtual machine state 310 includes a localized portion 311, and a centralized portion 312. The ellipses 313 represent that there may be other portions of the virtual machine state 310 as well. The localized portion 311 is present in local storage of the host computing system 210, whereas the centralized portion is located outside of the host computing system 210.

The external virtual machine state 312 is accessed (as represented by line 322 in FIG. 2) from external to the host computing system 201, and thus may represent a higher latency and slower network connection. The internal virtual machine state is accessed (as represented by line 321 in FIG. 2) from internal to the host computing system 201, and thus may be lower latency and higher speed access. In accordance with the embodiments described herein, the allocation of soft resources is made in a way that improves performance of the virtual machine, and which also allows for efficient migration of the virtual machine from one physical support environment to another. For instance, although not required, the centralized virtual machine state 312 may be user data, and the localized virtual machine state 311 may be replicas, or data derivable from the replicas (such as backing files) that support the virtual machine operating system and application set.

Figure 4:
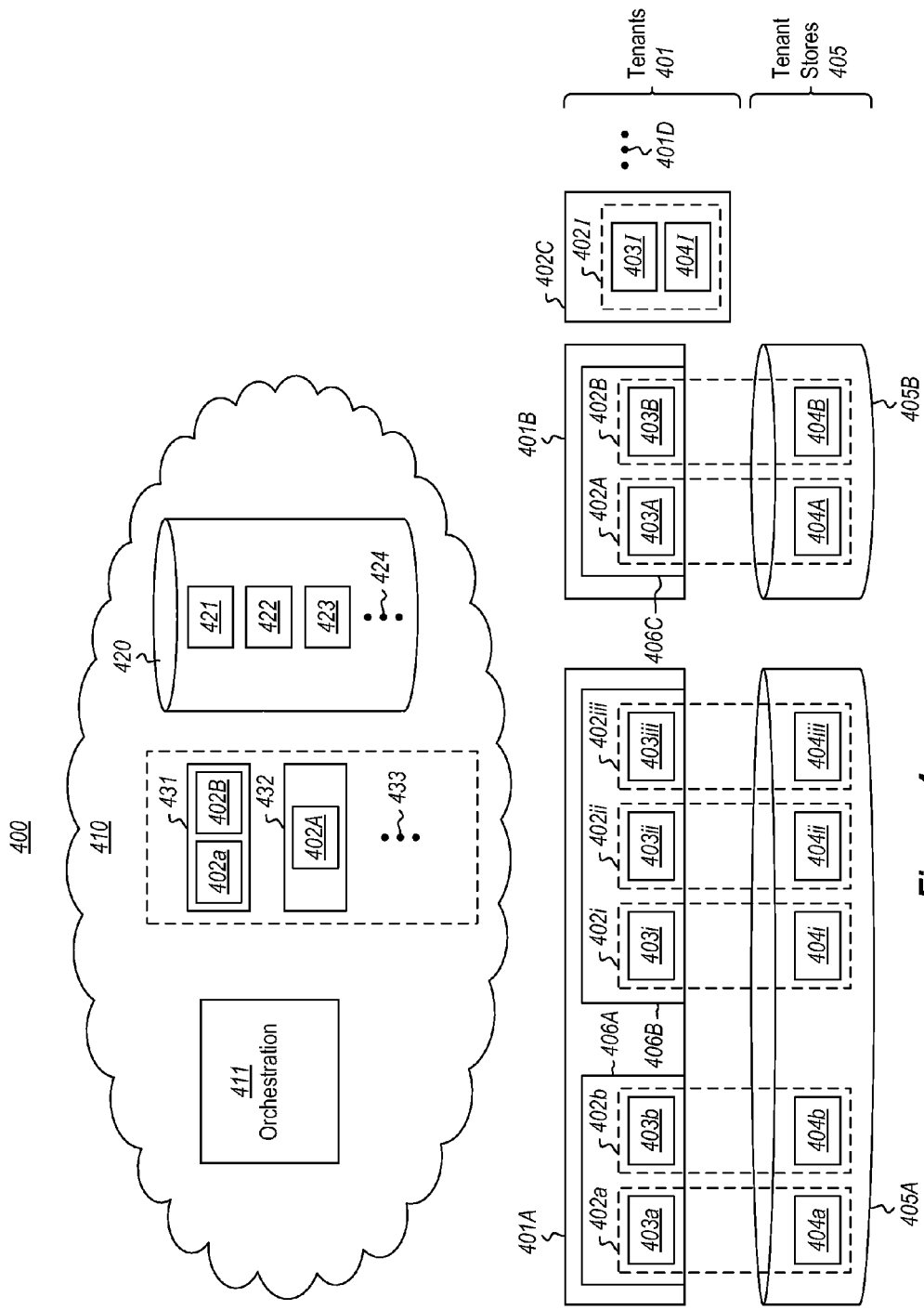
FIG. 4 illustrates an environment that includes a cloud computing environment supporting migration and failover services for multiple tenants.

FIG. 4 illustrates an environment 400 that includes a cloud computing environment 410. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Referring again to FIG. 4, the cloud computing environment 410 serves multiple tenants 401 that are external to the cloud computing environment 410. In the illustrated case, the tenants include a first tenant 401A, second tenant 401B, and third tenant 401C. However, the ellipses 401D represent that there may be any number of tenants served by the cloud computing environment 410. For instance, there could also be three or more, and potentially thousands (with no upper limit) of tenants served by the cloud computing environment 410. Because the cloud computing environment 410 has the potential to serve multiple clients, the cloud computing environment 410 may be considered a "public cloud". On the other extreme, the environment 400 might not be a multi-tenant environment at all, in which case there may be but a single tenant served by the cloud computing environment 410. A "tenant" may be, for example, an organization, individual, or other entity for which isolation of at least some of the data owned by the entity is desired. However, the term "tenant" is known in the art of cloud computing, and the definition set forth herein as not intended to supervene the meaning in the art as of the time of the filing of this patent application.

The tenant 401A operates two host computing systems 406A and 406B, each perhaps being structured and operate as described with respect to the host computing system 201 of FIG. 2. Tenant 401B operates one host computing system 406C, which may also be structured and operate as described with respect to the host computing system 201 of FIG. 2. The tenants 401A and 401B may operation their respect host computing systems in, for example, a private cloud, in which services are restricted primarily to the corresponding tenant. The tenant host computing systems 406A, 406B and 406C may be collectively referred to herein as "tenants host computing systems 406". In convention tenant organizations, the host computing systems are typically somewhat underutilized so as to be able to migrate virtual machines from one host computing system to another in case of failover. However, in accordance with the principles described herein, failover is provided by the cloud computing environment 410. Thus, the host computing systems 406 may operate at closer to full capacity, making more efficient use of the host computing systems 406, and potentially allowing the tenants 401A and 401B to operate without failover equipment and without having to have the labor and skill required to configure failover equipment.

There is an additional tenant 401C that operates as a "personal cloud" in that it is just a laptop or other computing system in the presence of a single user at a time. The tenant 401C has a single computing system that runs thereon a virtual machine 4021.

The failover service is more generally a "migration service" since migration of virtual machines from a tenant host computing system may be performed for reasons other than failover, whenever there is an advantage to migrate virtual machines off of a tenant host computing system. As a non-limiting example, the migration of virtual machines may occur in order to reconfigure a host computing system. This migration service is illustrated in FIG. 4 in the form of orchestration service 411.

As described above with respect to FIGS. 2 and 3, each of the host computing systems 406 runs virtual machines. For instance, host computing system 406A operates virtual machines 402*a* and 402*b*, each virtual machine perhaps being structured as described above for the virtual machine 301 of FIG. 3. For instance, virtual machine 402*a* has a localized virtual machine state portion 403*a* which represents an example of the localized portion 311 of FIG. 3, and a centralized virtual machine state portion 404*a* which represents an example of the centralized portion 312 of FIG. 3. Likewise, virtual machine 402*b* has localized virtual machine state portion 403*b* and centralized virtual machine state portion 404*b*.

In like manner, host computing system 406B includes virtual machines 402*i*, 402*ii* and 402*iii*, each having respective localized virtual machine state portions 403*i*, 403*ii* and 403*iii*, and each having respective centralized virtual machine state portions 404*i*, 404*ii* and 404*iii*. Referring to tenant 401B, host computing system 406C includes virtual machines 402A and 402B, each having respective localized virtual machine state portions 403A and 403B, and each having respective centralized virtual machine state portions 404A and 404B.

The virtual machines 402*a*, 402*b*, 402*i*, 402*ii*, 402*iii*, 402A and 402B may also be collectively referred to hereinafter as "virtual machines 402". Likewise, localized virtual machine state portions 403*a*, 403*b*, 403*i*, 403*ii*, 403*iii*, 403A and 403B may also be collectively referred to hereinafter as "localized virtual machine state portions 403" or simply "localized VM state 403". Finally, centralized virtual machine state portions 404*a*, 404*b*, 404*i*, 404*ii*, 404*iii*, 404A and 404B may also be collectively referred to hereinafter as "centralized virtual machine state portions 404" or simply "centralized VM state 404".

The centralized VM state 404 is kept in respective tenant stores 405. For instance, centralized VM states 404*a* and 404*b* corresponding to respective virtual machines 402*a* and 402*b* are stored in the tenant store 405A accessible to tenant 401A. Also, centralized VM states 404*i*, 404*ii* and 404*iii* corresponding to respective virtual machines 402*i*, 402*ii* and 402*iii* are stored in the tenant store 405A accessible to tenant 401A. On the other hand, centralized VM states 404A and 404B corresponding to respective virtual machines 402A and 402B are stored in the tenant store 405B accessible to the tenant 401B. The tenant stores 405 may be any storage architecture that allows the corresponding tenant access to the data stored therein. For example, the tenant stores 405 may be Storage Area Networks (SANs). However, the tenant stores may also be storage services offered by third parties to the corresponding tenant. Hierarchical storage architectures are also possible. For instance, a copy of the centralized VM state 404 may be kept in a SAN, with a backup being perhaps provided by an external storage service.

The cloud computing environment 410 includes a store 420 in which localized virtual machine state portions 421, 422 and 423 are stored. The ellipses 424 represents that there is no limit to the number of localized virtual machine state portions 421, 422 and 423 that may be stored within the store 420. In one embodiment, described in further detail hereinafter, the localized VM states 404 are different than the localized VM states 421 through 423. However, the localized VM state may be derived from either. For instance, the localized VM state 404 may be backing files for the corresponding virtual machine. However, the localized VM states 421 through 423 may be replica images corresponding to the pool from which the corresponding virtual machine was spun up. In one embodiment, the replica store 420 has replica images for each pool of virtual machine, and for each dedicated virtual machine. Thus, in the case of pooled virtual machines, there is only one replica image in the replica store 420.

The cloud computing environment 410 also includes a number of host computing systems 430 including host computing system 431 and 432. However, the ellipses 433 represents that there may be any number of host computing systems within the cloud computing environment 410 from as few as one and with no upper limit Each of the host computing systems 430 may be structured as described above for the host computing system 201. Although virtual machines 402a, 402A and 402B are shown operating within the host computing systems 430, prior to migration, such virtual machines 402a, 402A and 402B would not yet be operating within the host computing systems 430.

The cloud computing environment 400 also includes a migration orchestration module 411. The module 411 may be a single component, or a combination of components, or even an entire service, perhaps even being distributed. The migration orchestration module 411 facilitates migration of a virtual machine from a tenant host computing system to the cloud computing environment. For instance, the migration orchestration module 411 may migrate any of the virtual machines 402 from the respective tenant host computing system 406 into a cloud host computing system 430.

In the illustrated embodiment, for example, virtual machine 402a has been migrated from tenant host computing system 406A of tenant 401A into the cloud host computing system 431. In addition, virtual machine 402A has been migrated from tenant host computing system 406C of tenant 401B into the cloud host computing system 432. Furthermore, virtual machine 402B has been migrated from tenant host computing system 406A into cloud host computing system 431.

Note that there need not be any correlation between the tenant host computing systems and the cloud host computing systems, nor need there be any correlation between the tenant and the cloud host computing systems. For instance, all of the virtual machines 402A and 402B on the host computing system 406C have been migrated into the cloud host computing systems 430, but they reside on different cloud host computing systems (virtual machine 402A being on cloud host computing system 432 and virtual machine 402B being on cloud host computing system 431).

Also, note that virtual machines from different host computing systems, and even different tenants, are located on the same cloud host computing system. For instance, virtual machine 402a migrated from tenant host computing system 406A belonging to tenant 401A is actually running on the same cloud host computing system 431 as the virtual machine 402B migrated from tenant host computing system 406C belonging to tenant 401B. This flexibility allows there to be much fewer cloud host computing systems that provide migration (or failover) service for the tenants 401 than there are tenant host computing systems amongst the tenants.

The migration orchestration component 411 performs migration of a virtual machine by maintaining a replica image (from which the localized virtual machine state may be derived), and also by determining a location of associated user data that represents the centralized virtual machine state portion. Thus, the centralized VM state is accessible to both the tenant host computing system on which the virtual machine originally ran, and the cloud host computing system to which the virtual machine is migrated.

Figure 5:
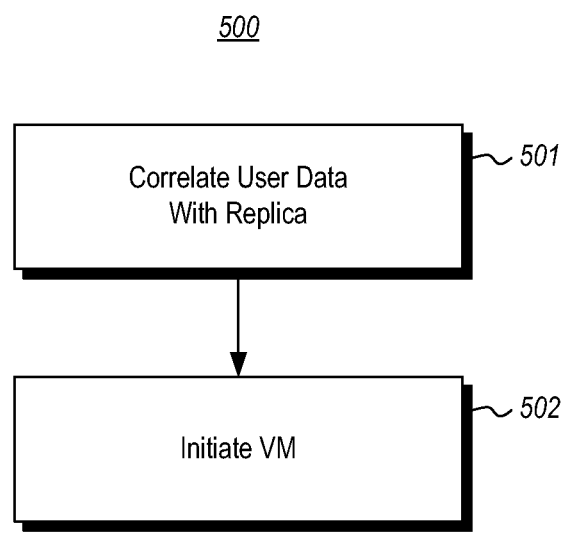
FIG. 5 illustrate a flowchart of a method for migrating virtual machines from a tenant host computing system to a cloud host computing system.

In this state, FIG. 5 illustrates a flowchart of a method 500 for the migration orchestration component 411 to migrate a virtual machine from a tenant host computing system 406 to a cloud host computing system 430. For the given virtual machine, the migration orchestration component 411 identifies the corresponding replica image for the virtual machine, and associates the replica image with the associated user data (act 501). For instance, when migrating virtual machine 402a, the orchestration component 411 associates a replica image (e.g., replica image 422) that may be used to derive the backing files 403a with the user data 404a. When migrating virtual machine 402A, the orchestration component 411 associates a replica image (e.g., replica image 423) that may be used to derive the backing files 403A with the user data 404A. When migrating virtual machine 402B, the orchestration component 411 associates a replica image (e.g., replica image 422) that may be used to derive the backing files 403B with the user data 404B. Note that virtual machines, even corresponding to different tenants, may have the same localized VM state. For instance, the backing files 403a and 403B from respective virtual machines 402a and 403B are derived from identical replica images that are formed from the same master image. The user data, on the other hand, may represent more tenant specific data.

The orchestration component 411 then instantiates the virtual machine in one of the cloud host computing systems in the cloud computing environment using the replica and user data (act 502). The orchestration component 411 keeps track of which virtual machine came from which host computing system, and from which tenant. Furthermore, the orchestration component 411 keeps track of which cloud host computing system the virtual machine runs in, and how the virtual machine is identified in the cloud host computing system. The orchestration component 411 also ensures isolation between user data from different tenants. Thus, if a virtual machine from one tenant requests user data from a virtual machine from another tenant, that request is not honored, and access is prevented.

As the virtual machine operates in the cloud computing environment, any changes to the user data may be propagated to the user data on the tenant store, or perhaps to another location. When the time comes to restore the virtual machine to the tenant host computing system, the orchestration component 411 provides the updated changes to the user data back to the tenant store (if the changes to the user data were not propagated to the tenant store as the virtual machine was operating in the cloud computing environment). The virtual machine may then be restored by associated backing files derived from the associated replica image with the user data, and instantiating the virtual machine in the tenant environment.

The orchestration component 411 may facilitate instantiation of the virtual machine (act 502) at locations other than the cloud host computing system 410. For instance, referring to the tenant 401C of FIG. 1, suppose that virtual machine 402I is to operate in offline mode. In preparation for such offload mode operation, if there is any user data or other centralized portion 404I that is maintained at the cloud computing environment 410, the orchestration component may propagate that user data to the tenant 401C. Furthermore, if the tenant 401C does not have a full instance of the replica image, the orchestration component 411 may replicate all or a portion of the appropriate replica image to the tenant 401C so that the tenant machine has a full and updated replica image. The orchestration component may be further configured to determine what needs to be transmitted to the tenant 401C in order to have the localized portion 403I and the centralized portion 404I of the virtual machine 402I. The tenant 401C may then instantiate the virtual machine 402I locally. Thus, the orchestration component 411 may facilitate a personal cloud on the client computing system of the tenant 402C.

Thus, mechanisms for cloud-based migration (e.g., failover) of virtual machines have been described. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for a cloud computing environment to facilitate migration of a virtual machine from a host computing system to the cloud computing environment, the method comprising the following for at least one virtual machine:
   maintaining a first instance of a localized portion of a virtual machine state for the virtual machine on the host computing system, wherein the localized portion of the virtual machine state comprises at least one of backing files for the virtual machine and a replica image for the virtual machine;
   maintaining a second instance of the localized portion of the virtual machine state for the virtual machine in the cloud computing environment external to the host computing system that hosts the virtual machine;
   determining a location of a centralized portion of the virtual machine state for the virtual machine that is accessible to the host computing system and the cloud computing environment, wherein the centralized portion of the virtual machine state comprises user data for the virtual machine, the centralized portion and the localized portion of the virtual machine state each including a portion of the virtual machine state excluded from the other, and the location of the centralized portion of the virtual machine state being different from a location of the first instance of the localized portion and a location of the second instance of the localized portion, and the location of the centralized portion of the virtual machine state being external to the cloud computing environment and the host computing system;
   responding to a determination that migration of the virtual machine from the host computing system to the cloud computing environment is to occur, migrating the virtual machine from the host computing system to the cloud computing environment by:
   correlating the centralized portion of the virtual machine state for the virtual machine with the second instance of the localized portion of the virtual machine state for the virtual machine; and
   instantiating the virtual machine in the cloud computing environment using the centralized portion of the virtual machine state and the second instance of the localized portion of the virtual machine state;
   wherein
   prior to migrating the virtual machine from the host computing system to the cloud computing environment, the virtual machine operates at the host computing system to provide a client image state for a corresponding client computing device; and
   after migrating the virtual machine from the host computing system to the cloud computing environment, the virtual machine operates at a cloud host computing system in the cloud computing environment to provide the client image state for the same corresponding client computing device.

2. The method in accordance with claim 1, wherein the second instance of the localized portion of the virtual machine state is a replica corresponding to the virtual machine.

3. The method in accordance with claim 1, wherein the virtual machine is a first virtual machine, the method further comprising:
   maintaining a second instance of a localized portion of virtual machine state of a second virtual machine in the cloud computing environment;
   determining a location of a centralized portion of the virtual machine state of the second virtual machine;
   in response to determining that migration of the second virtual machine from the host computing system to the cloud computing environment is to occur, performing the following:
   correlating the centralized portion of the virtual machine state of the second virtual machine with the second instance of the localized portion of the virtual machine state of the second virtual machine; and
   instantiating the second virtual machine in the cloud computing environment using the centralized portion of the virtual machine state of the second virtual machine and the second instance of the localized portion of the virtual machine state of the second virtual machine.

4. The method in accordance with claim 3, wherein the first and second virtual machines operated on the host computing system prior to migration.

5. The method in accordance with claim 3, wherein the first and second virtual machines belong to a same tenant.

6. The method in accordance with claim 3, wherein the first and second virtual machines belong to different tenants.

7. The method in accordance with claim 6, wherein the method further comprises:
   preventing a first tenant corresponding to the first virtual machine from accessing the second virtual machine in the cloud computing environment; and
   preventing a second tenant corresponding to the second virtual machine from accessing the first virtual machine in the cloud computing environment.

8. The method in accordance with claim 6, wherein the first and second virtual machines operate on the same cloud host computing system in the cloud computing environment.

9. The method in accordance with claim 1, wherein the method is performed for all virtual machines running in the host computing system.

10. The method in accordance with claim 1, wherein the migration occurs as part of a failover event in which performance of the host computing system is at least degraded.

11. A computer program product comprising one or more computer storage media having thereon computer-executable instructions that, when executed by one or more processors of a computing system, cause the computing system to perform a method for a cloud computing environment to facilitate migration of a virtual machine from a host computing system having a first instance of a localized portion of a virtual machine state to the cloud computing environment in a context in which a second instance of the localized portion of the virtual machine state machine for a plurality of virtual machines are maintained in the cloud computing environment external to the particular host computing systems that host each of the virtual machines, wherein the localized portion of the virtual machine state comprises at least one of backing files for the virtual machine and a replica image for the virtual machine, the method comprising the following for at least one of the plurality of virtual machines;
   determining a location of a centralized portion of the virtual machine state that is accessible to the particular host computing system for that virtual machine and the cloud computing environment, wherein the centralized portion of the virtual machine state comprises user data for the virtual machine, the centralized portion and the localized portion of the virtual machine state each including a portion of the virtual machine state excluded from the other, and the location of the centralized portion of the virtual machine state being different from a location of the first instance of the localized portion and a location of the second instance of the localized portion, and the location of the centralized portion of the virtual machine state being external to the cloud computing environment and the particular host computing system;

responding to a determination that migration of the virtual machine from the particular host computing system to the cloud computing environment is to occur, migrating the virtual machine from the host computing system to the cloud computing environment by:

correlating the centralized portion of the virtual machine state for that virtual machine with the second instance of the localized portion of the virtual machine state for that virtual machine; and instantiating that virtual machine in the cloud computing environment using the centralized portion of the virtual machine state and the second instance of the localized portion of the virtual machine state;

wherein prior to migrating the virtual machine from the host computing system to the cloud computing environment, the virtual machine operates at the host computing system to provide a client image state for a corresponding client computing device; and after migrating the virtual machine from the host computing system to the cloud computing environment, the virtual machine operates at a cloud host computing system in the cloud computing environment to provide the client image state for the same corresponding client computing device.

12. The computer program product in accordance with claim 11, wherein the second instance of the localized portion of the virtual machine state is a replica corresponding to the virtual machine.

13. The computer program product in accordance with claim 11, wherein the virtual machine is a first virtual machine, the method further comprising;

determining a location of a centralized portion of the virtual machine state of a second virtual machine;

in response to determining that migration of the second virtual machine from the host computing system to the cloud computing environment is to occur, performing the following:

correlating the centralized portion of the virtual machine state of the second virtual machine with the second instance of a localized portion of the virtual machine state of the second virtual machine; and instantiating the second virtual machine in the cloud computing environment using the centralized portion of the virtual machine state of the second virtual machine and the second instance of a localized portion of the virtual machine state of the second virtual machine.

14. The computer program product in accordance with claim 13, wherein the first and second virtual machines operated on the host computing system prior to migration.

15. The computer program product in accordance with claim 13, wherein the first and second virtual machines belong to a same tenant.

16. The computer program product in accordance with claim 13, wherein the first and second virtual machines belong to different tenants.

17. The computer program product in accordance with claim 16, wherein the method further comprises:

preventing a first tenant corresponding to the first virtual machine from accessing the second virtual machine in the cloud computing environment; and preventing a second tenant corresponding to the second virtual machine from accessing the first virtual machine in the cloud computing environment.

18. The computer program product in accordance with claim 11, wherein the method is erformed for all virtual machines running, in the host computing system.

19. A cloud computing environment comprising:

a replica store in which a plurality of replicas are stored that correspond to a plurality of virtual machines, each virtual machine running on a source computing system outside the cloud computing environment and each replica corresponding to one of the virtual machines, wherein for each virtual machine in the plurality of virtual machines the source computing system on which that virtual machine is running comprises at least one of backing files corresponding to the replica stored on the replica store and a source replica image corresponding to the replica stored on the replica store;

a plurality of host computing systems;

a migration orchestration module that, for at least some of the plurality of virtual machines, upon determining that migration of the corresponding virtual machine is to occur from the source computing system on which the corresponding virtual machine is running into the cloud computing environment, migrates the corresponding virtual machine from the source computing system to the cloud computing environment by:

correlating a particular replica from the plurality of replicas in the replica store with user data associated with the corresponding virtual machine, wherein the user data is stored at a location different from the replica store, and the location of the user data is external to the source computing system and the cloud computing environment; and instantiating the corresponding virtual machine in one of the plurality of host computing systems in the cloud computing environment using the particular replica and the user data;

wherein prior to migrating the virtual machine from the source computing system to the cloud computing environment, the virtual machine operates at the host computing system to provide a client image state for a corresponding client computing device; and after migrating the virtual machine from the source computing system to the cloud computing environment, the virtual machine operates at one of the host computing systems in the cloud computing environment to provide the client image state for the same corresponding client computing device.

20. The cloud computing environment of claim 19, wherein virtual machines migrated from a plurality of tenants are containable in a single host computing system of the plurality of host computing systems, wherein the migration orchestration module further ensures isolation between virtual machines from different tenants.

* * * * *

UNITED STATES PATENT AND TRADEMARK OFFICE
CERTIFICATE OF CORRECTION

| | | |
|---|---|---|
| PATENT NO. | : 9,977,698 B2 | Page 1 of 1 |
| APPLICATION NO. | : 13/563603 | |
| DATED | : May 22, 2018 | |
| INVENTOR(S) | : Peter Bookman et al. | |

It is certified that error appears in the above-identified patent and that said Letters Patent is hereby corrected as shown below:

In the Claims

Column 14, Claim 18, Line 13 delete the word "erformed" and substitute therefor --performed--.

Signed and Sealed this
Twenty-eighth Day of May, 2019

Andrei Iancu
*Director of the United States Patent and Trademark Office*